United States Patent [19]

Lorteije et al.

[11] 4,353,062

[45] Oct. 5, 1982

[54] MODULATOR CIRCUIT FOR A MATRIX DISPLAY DEVICE

[75] Inventors: Jean H. J. Lorteije; Geert Warrink; Henri W. Schneider, all of Eindhoven, Netherlands

[73] Assignee: U.S. Philips Corporation, New York, N.Y.

[21] Appl. No.: 140,406

[22] Filed: Apr. 14, 1980

[30] Foreign Application Priority Data

May 4, 1979 [NL] Netherlands .................... 7903515

[51] Int. Cl.³ ........................................... G09G 3/22
[52] U.S. Cl. .................................. 340/767; 340/792; 358/241
[58] Field of Search ............... 340/793, 767; 358/230, 358/240, 241

[56] References Cited

U.S. PATENT DOCUMENTS

| 4,021,607 | 5/1977 | Amano | 340/767 X |
| 4,193,095 | 3/1980 | Mizushima | 340/793 X |
| 4,210,934 | 7/1980 | Kutaragi | 358/241 |

Primary Examiner—David L. Trafton
Attorney, Agent, or Firm—Robert S. Smith

[57] ABSTRACT

A modulator circuit for a matrix display device, the modulator circuit having pulse width and pulse amplitude control. The current amplitude for a selected picture element (row address-column address) varies during the pulse width of an excitation pulse in correspondence with the number of counting positions of a counting circuit used for determining the pulse width.

A column conductor has an associated column excitation circuit in which a counting circuit for determining the excitation pulse width controls excitation switches which pass selectively currents from current source $I_A$ ... $64I_A$ of a current source circuit to the column conductor. The initial setting of the counting circuit determines the excitation pulse width, and the count positions of the counting circuit select the currents to be passed to the column conductor as the counting circuit is stepped by clock pulses to measure the duration of the excitation pulse.

14 Claims, 7 Drawing Figures

MODULATOR CIRCUIT FOR A MATRIX DISPLAY DEVICE

The invention relates to a modulator circuit of a type suitable for a matrix display device having k columns and r rows, comprising a row selection circuit for sequentially electrically exciting r rows, and k column excitation circuits for exciting the k column conductors respectively. Each column excitation circuit comprising a counting circuit having N counting elements and a current source circuit, the counting circuits always being adjusted shortly prior to the selection of a next row to initial positions corresponding to the display (picture) information applied to the modulator circuit for the corresponding elements of this row, a number of counting pulses being applied to all counting circuits during a row selection period, this number not exceeding $2^N$, each counting circuit counting by means of these counting pulses from the preset initial position until a fixed final position has been reached to determine the pulse width of the excitation pulse applied to a picture element corresponding with that counting circuit and the current source circuit determining the maximum amplitude of this excitation pulse.

Modulator circuits of this type are inter alia used to drive flat display screens for television receivers and for matrix-type digital output-equipment comprising picture elements such as gas discharge display cells, light emitting diodes, etc. Generally, the self-scan principle is used for scanning the rows, which presumes a certain minimum current through all elements of a selected row. This current is also desired for adjusting the so-called background level.

The elements are further limited to a certain maximum value of the current through one single element. The ratio between the minimum current and the maximum current is too low to achieve a sufficiently high contrast by means of amplitude modulation only, so that a combination of amplitude modulation and pulse width modulation is required.

Furthermore, it is usually required that the picture brightness does not linearly depend on the applied picture information, for example in view of compensating for the a γ-correction, used at the transmitter end.

A modulator circuit of the above-mentioned type is known from the published Netherlands Patent Application No. 7702395.

A square-law brightness modulation is obtained by means of that modulator circuit by applying the picture information received from an analog-to-digital converter, to a counting circuit and to a current source circuit.

As a result the counting circuit is loaded in an initial position which corresponds with the digital picture information, and then counts during the row selection period from that position until a fixed final position is reached for example by counting down to the zero position, whereafter the counting circuit stops counting automatically. The required counting time determines the pulse width of an excitation signal applied to a picture element.

The digital picture information is also applied to a number of inputs of a current source circuit which produces a current during the pulse duration which is proportional to the value of the applied picture information.

It is then necessary for the picture information to remain unchanged, at least during the pulse duration which, in practice, in view of the desired uniform electronic control, means that the picture information must remain constant during the total row selection period.

This means that each column requires either an analog-to-digital converter which retains its position after sampling of the video signal, or a column buffer-register.

It is an object of the invention to provide a modulator circuit wherein this storage function need not be obtained by the use of an N-bit buffer per column.

According to the invention, a modulator circuit of the type mentioned above is characterized in that for the duration of the excitation pulse the current source circuit for a column applies a finite current which varies with time, to the picture element selected in the column, this current always corresponding with the number of used, consecutive positions of the counting circuit.

Accordingly the counting circuit actually takes over the storage function, so that any freely selectable curve for the brightness modulation can be set by providing a suitable control of the current source circuit by the counting circuit. If is, for example, possible to have the amplitude of the current, supplied by the current source circuit, increase linearly for one picture element from zero upwards or decrease down to zero, so that a square-law modulation is obtained, as the entire pulse becomes triangular in shape and the area of this triangle increases in proportion to the square of the pulse width, which also applies to the average brightness of the picture element obtained in response thereto.

As television display screens and comparable screens usually require some hundreds of columns, the above measure results in a saving of some thousands of flip-flops when for example 8-bit picture information is used. This is a very considerable saving, the more so as these flip-flops cannot be implemented as a so-called large-scale integrated circuit (LSI-circuit), owing to the very high number of connections required.

An advantageous embodiment of a modulator circuit according to the invention is characterized in that each current source circuit comprises N current sources each having a current output, and N excitation switches, each current source output being connected to an input of the corresponding excitation switch and all outputs of these excitation switches being connected together to the column conductor associated with the current source circuit, and the position of the N switches being determined by the position of the counting elements of the counting circuit associated with this same current source circuit, for example, in such a way that for the current source circuit of a column excitation circuit, the position of the excitation switch i (i=0, 1, ..., N−1) for the current source i is determined by the position of counting element i of the counting circuit for that same column excitation circuit.

In particular this may provide a very good approximation of a square-law brightness modulation, when the i current sources of a current source circuit are arranged for producing i mutually different currents which are substantially in the ratio of $1:3:8: \ldots :2^i: \ldots :2^{N-1}$ wherein $i=3, 4, \ldots, N-2$.

This approximation can be further improved as the first excitation switch (i=0) of a current source circuit, switches the first current source on when during the second counting pulse applied to the counting circuit, the position of the second counting element (i=1) corresponds to the value "1", for supplying a correction current.

These embodiments have in common that the current source circuit is always directly controlled by means of switches coupled to the counting circuit.

In the circuit described in the above-mentioned Netherlands Patent Application the quiescent current $i_o$ which determines the background level is realized by an additional current source for which an extra reference voltage is required.

This quiescent (background) current can be generated in a simpler way if in each column excitation circuit at least one of the current sources is switched on during a load pulse for the counting circuit, the pulse width of the load pulse being chosen such that a desired background level for the picture elements is obtained.

A modulator circuit in accordance with the invention may be further characterized in that it comprises a central current source for producing a current which varies with time during a row selection period, and the current source for each column excitation circuit consists of a current mirror for supplying a current to the column conductor corresponding with said current source during the period of time determined by the counting circuit of the column excitation circuit, this current being substantially equal to the current through the central current source.

These further characterizing features are based on the recognition of the fact that the desired current variation is of the same shape in all cases, apart from the clipping due to pulse width setting. This renders it possible to generate this shape only once centrally by means of a central current source and to supply k mutually equal currents all having the same shape as that of the current through the central current source to the k column conductors by means of k current mirrors, during the pulse durations for the respective columns.

This results in that N current sources and N switches per column are replaced by one current mirror and one switch, respectively.

This requires only one central current source, so that the number of current sources required (inclusive of the current mirrors) decreases by $K.N-(N+1)=K.(N-1)-1$.

The shape of the current variation of the central current source may be such that during the consecutive counting pulses within one row selection period, the central current source generates one of a plurality of current amplitude values, which is substantially constant during the duration of a counting pulse, so that a staircase curve is generated when the central current source is digitally controlled or, that the central current source generates a continuously varying current during a row selection time, the central current source generating a repetitive cyclically varying current curve, which has for example a sawtooth shape.

In both cases a square-law brightness modulation can be obtained if the current of the central current source varies substantially linearly with time during a row selection period.

The quiescent (background) current $i_o$ can be obtained in a similar manner to that described above if each column excitation circuit comprises a gate circuit coupling the output of a current mirror to the column conductor when the counting circuit is in a counting position not equal to the fixed final position and also when a load pulse for the counting circuit is present, the pulse width of the load pulse being such that a desired background level for the picture elements is obtained.

A number of embodiments of a modulator circuit according to the invention will now be described hereunder in greater detail by way of example with reference to the accompanying drawings.

Figure 1:
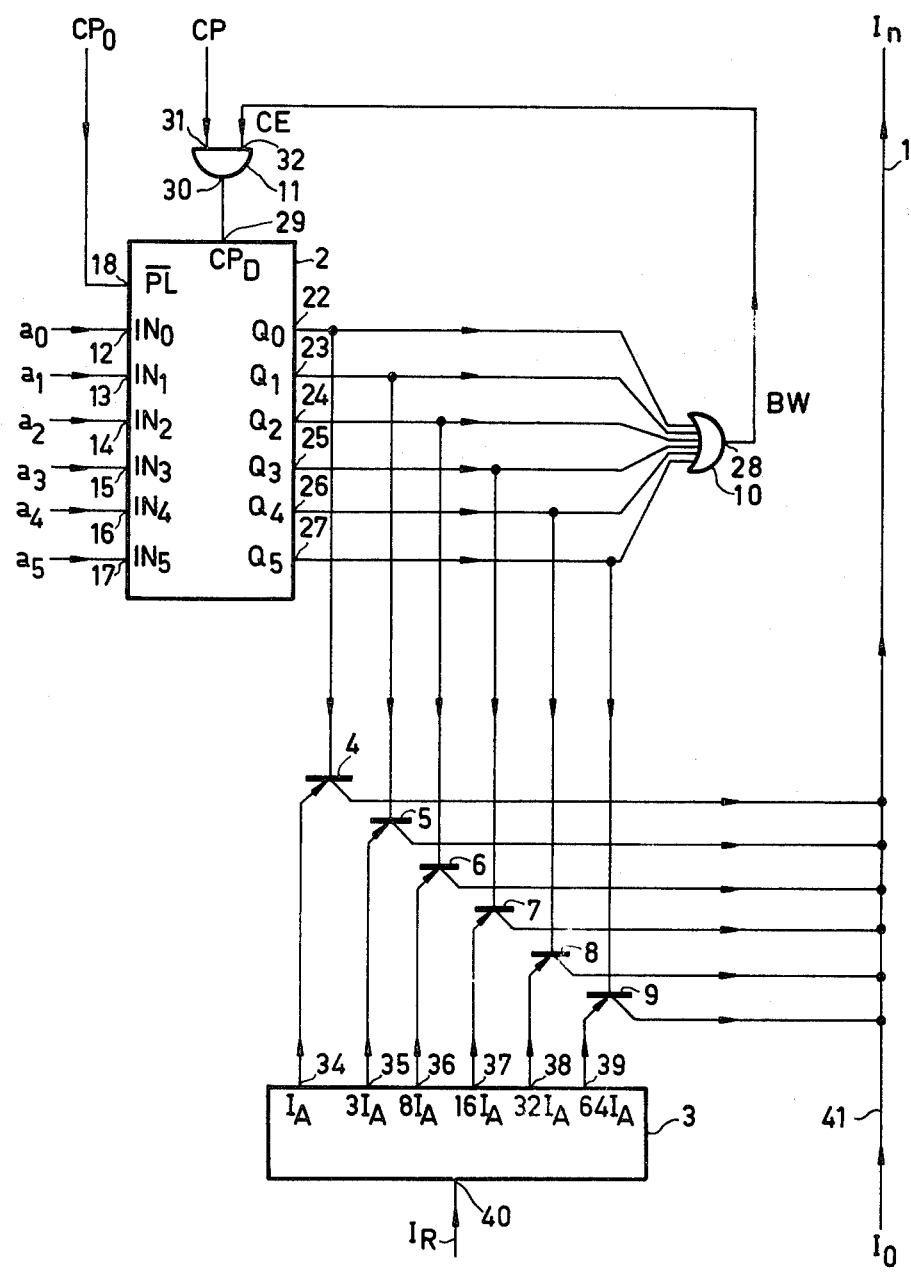
FIG. 1 shows a simplified modulator circuit for obtaining a square-law brightness modulation by means of current source circuits controlled by the counting circuits.

In FIG. 1, a portion of the modulator circuit for exciting one column conductor $n(n=0, 1, \ldots k-1)$, 1 consists of a counting circuit 2, a current source circuit 3 and a number N of excitation switches 4 to 9 inclusive. In this example N is chosen to be equal to 6.

The end of the counting period is obtained by means of a gate circuit consisting of an OR-gate 10 and an AND-gate 11. The counting circuit 2 may, for example, be constituted by a synchronous binary counter of the type Signetics 54193 as described in Philips Data Handbook 1978, Signetics integrated circuits, Volume; Logic TTL, pages 340-343.

Although the gate circuit 10, 11 is usually already incorporated in integrated circuit counters of this type, the gates 10 and 11 are shown separately for the sake of clarity.

The counting circuit 2 has a number of inputs 12 to 17; inclusive, for setting to an initial position, to which inputs digital signals $a_o$ to $a_5$ inclusive, can be supplied. In addition, the counting circuit 2 has an input 18 for a load command signal $CP_0$ produced by a timing circuit (not shown).

The counting circuit 2 comprises N counting flipflops (not shown) having outputs 22 to 27 respectively, which are connected to respective switching inputs of the switches 4 to 9 and also to respective inputs of the OR-gate 10. This results in a transmission signal, usually denoted as "Borrow" output (BW), at the output 28 of the OR-gate 10.

In addition, the counting circuit 2 has a counting input 29 for a counting signal, this input 29 being connected to an output 30 of the AND-gate 11, an input 31 of which receives clock pulses CP from a timing circuit (not shown) for counting down, a second input 32 being connected to the BW-output 28.

When the counting circuit 2, in response to an input signal combination wherein $a_o$ to $a_5=0$ is set to the zero position by the load comman signal $CP_0$ at input 18, or remains in the zero position, all counting outputs 22 to 27, inclusive, have the value "0", so that the BW-output 28 is also "0". This renders the AND-gate 30 non-conductive, so that no counting pulses are applied to the counting input 29. The counting circuit 2 now remains in the "0" position until it is set by a load numeral signal $CP_0$ to a position different from "0" in either the next row selection period or one of the row selection periods subsequent thereto. This setting takes place when the inputs signals $a_o$ to $a_5$ are not all "0"s, the counting circuit 2 being set to an initial binary position corresponding to the input signal combination. Should, for example, $a_3$ be a "1", then the output 25 also becomes a "1", etc.

As now at least one output is a "1", the BW-output 28 also becomes "1", so that one or more counting pulses can be applied to the counting input 29. For instance, when the picture information constitutes a binary representation of the number 29, the counting circuit 2 is set initially to the position "29", and will successively count down to position "1" on receipt of 28 counting pulses. During this period of time at least one of the outputs 22 to 27 is always equal to "1" so that output 28 also shows always a "1". When, finally, the 29$^{th}$ counting pulse arrives, the counting circuit 2 is set to the "0" position, output 28 becomes "0", and no further counting pulses can be applied, so that the counting circuit 2 remains in the "0" position, at least during the remaining portion of the row selection period.

Counting down from the maximum position $2^{N-1}$ thus requires $2^{N-1}$ counting pulses so that it is advantageous to distribute $2^N$ clock periods uniformly over a row selection period or a somewhat shorter period of time.

The current source circuit 3 comprises N current sources having outputs 34 to 39 inclusive, for currents of $I_A$, $3I_A$, $8I_A$, $16I_A$, $32I_A$ and $64I_A$, respectively, these outputs 34 to 39 being connected to perspective inputs of the excitation switches 4 to 9. The outputs of these switches 4 to 9 are connected in common to the column conductor 1.

The current source circuit 3 has an input 40 for a reference current $I_R = pI_A$ wherein p represents a constant. In the case $p=1$, $I_R$ replaces the first current source (current $I_A$) and acts as a reference current for the remaining current sources. The current sources are not shown: several embodiments are known. The choice of the type and the construction of the current sources are not part of the invention.

It will be apparent that when the initial position of the counting circuit 2 is "0" only the current $I_0$ is applied during the row selection period to the column conductor 1 via the connection 41, as all counting outputs 22 to 27, inclusive are "0" and consequently all switches 4 to 9, inclusive, are in the non-conducting state.

If the initial position is "1" only the counting output 22 has the value "1" as soon as loading has been completed and a current $I_A$ is applied to the column conductor 1 for the duration of one clock period via the excitation switch 4. After one counting pulse the counting position assumes the position "0". For the case that the initial position is "2", only counting output 23 has the value "1" in the first clock period, so that a current $3I_A$ is applied to the column conductor 1 during the first clock period: in the second clock period only counting output 22 has the value "1" and $I_A$ is applied, so that apart from the current $I_0$ a total of 4 units $I_A$ is applied to the picture element at the junction of column conductor 1 and the row being addressed. If the initial position is "3", $(3+1)I_A$ is produced in the first clock period and in the second and third clock periods the same number of units $I_A$ i.e. $(4I_A)$ is applied to the picture element concerned as was applied for initial position "2" in the first and the second clock periods. Thus, 8 current units are now produced in the first three clock periods and no current units at all in the remaining portion of the row selection period. Table I shows how many current units are produced for the first 15 initial positions out of the total of $2^6 = 64$ initial positions which are possible.

TABLE I

| N | initial | $CP_0$ | $CP_1$ | $CP_2$ | $CP_3$ | $CP_4$ | $CP_5$ | etc. | current × time units |
|---|---------|--------|--------|--------|--------|--------|--------|------|----------------------|
| 1 | 000001 | 000001 | | | | | | | $1 \times I_A$ |
| 2 | 000010 | 000010 | 000001 | | | | | | $1 + 3 = 4I_A$ |
| 3 | 000011 | 000011 | 000010 | 000001 | | | | | $4 + 4 = 8$ |
| 4 | 000100 | 000100 | 000011 | 000010 | 000001 | | | | $8 + 8 = 16$ |
| 5 | 000101 | 000101 | 000100 | 000011 | 000010 | 000001 | | | $16 + 9 = 25$ |
| 6 | 000110 | 000110 | 000101 | 000100 | 000011 | 000010 | 000001 | | $25 + 11 = 36$ |
| 7 | 000111 | 000111 | 000110 | 000101 | 000100 | 000011 | 000010 | | $36 + 12 = 48$ |
| 8 | 001000 | 001000 | 000111 | etc. | | | | | $48 + 16 = 64$ |
| 9 | 001001 | 001001 | 001000 | etc. | | | | | $64 + 17 = 81$ |
| 10 | 001010 | 001010 | etc. | | | | | | $81 + 19 = 100$ |
| 11 | 001011 | 001011 | | | | | | | $100 + 20 = 120$ |
| 12 | 001100 | 001100 | | | | | | | $120 + 24 = 144$ |
| 13 | 001101 | 001101 | | | | | | | $144 + 25 = 169$ |
| 14 | 001110 | 001110 | | | | | | | $169 + 27 = 196$ |
| 15 | 001111 | 001111 | | | | | | | $196 + 28 = 224$ |
| | | | | | | | | | $224 + 32 = 256$ |
| | | | | | | | | | etc. |

The binary numbers 000001 etc. represent the initial states of the counting outputs 22 to 27, inclusive, in that order. A "1" in the first position of a binary number then corresponds to the current $64I_A$ in the clock period denoted by $CP_0$ and for any other clock period $CP_1$, $CP_2$, ... for which this "1" holds. A "1" in the last position indicates the current $I_A$ and similarly for the other positions which correspond to the currents $32I_A$, $16I_A$, $8I_A$ and $3I_A$, respectively.

Figure 3:
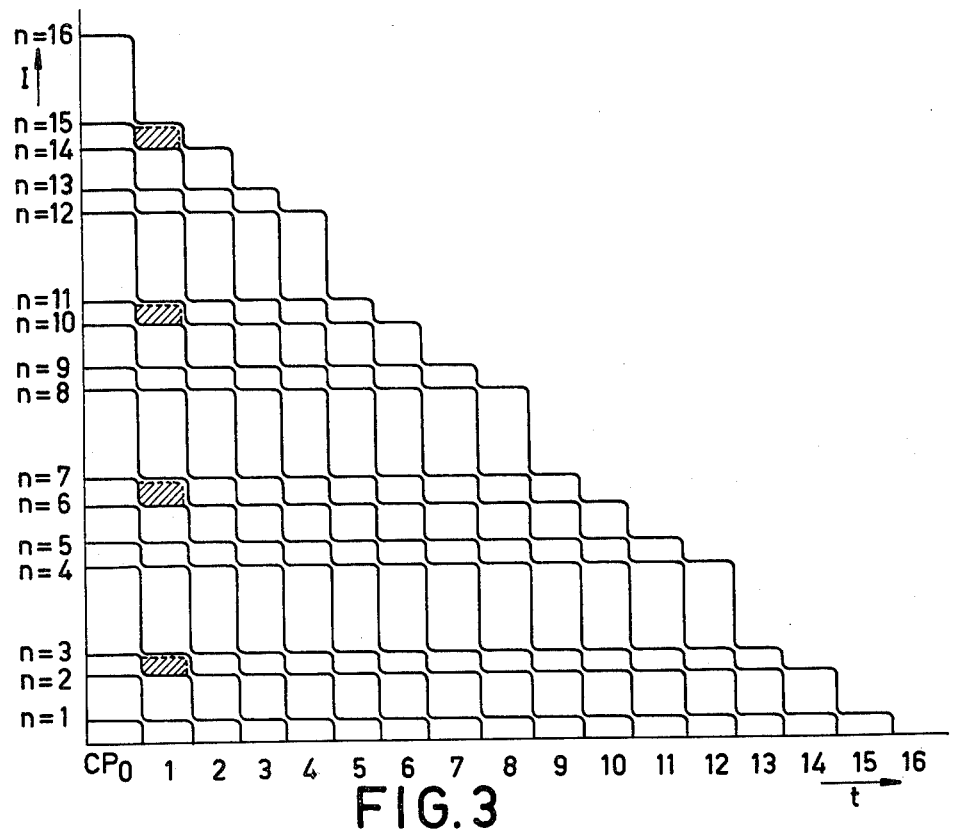
FIG. 3 shows the current forms, obtained by means of a circuit wherein N=4, for the 16 possible brightness levels as obtained by means of circuits shown in FIGS. 1 and 2.

The current variation during the beginning of a row selection period is shown in FIG. 3 by means of the solid curves.

Although a reasonable approximation of the desired square-law brightness modulation is obtained, the progression: 0, 1, 4, 8, 16, 25, 36, 48, 64, etc. is not fully quadratic: i.e. like 0, 1, 4, 9, 16, 25, 36, 49, 64, etc.

Every fourth possible initial position there is one current unit $I_A$ short. By introducing a correction current $I_A$ during the second clock period $CP_1$, as shown in FIG. 3 by means of hatching, the dotted curves are obtained, these successive curves enclosing areas which increase in a precisely quadratic manner.

Table I shows, (beneath column $CP_1$) that the shortage always occurs at a binary number xxxx10. However, with the switch 4 also opened when the counting output 23 has the value "1" during $CP_1$, xxxx10 would be translated into xxxx11 during this second clock period. The positions having xxxx11 remain xxxx11.

Figure 2:
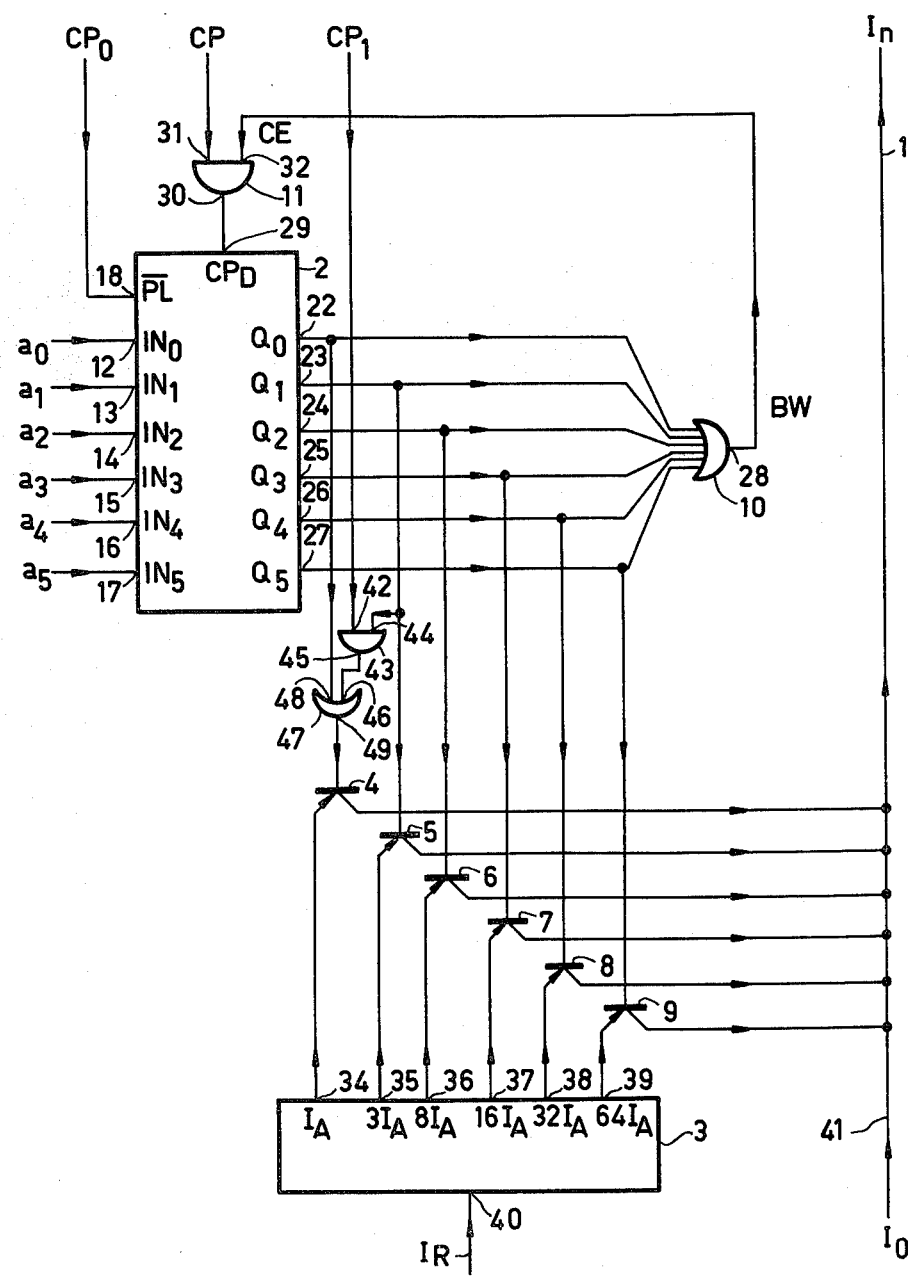
FIG. 2 shows the same modulator circuit, but with a gate circuit added to obtain a correction current.

FIG. 2 shows the correction circuit required for this purpose. Elements corresponding with those in FIG. 1 have been given the same references as in FIG. 1.

A signal $CP_1$ from the timing circuit is applied to an input 42 of an AND-gate 43 a further input 44 of which is connected to the counting output 23, which results in a signal $Q_1.CP_1$ at the output 45 of the AND-gate 43. This output 45 is connected to a first input 46 of an OR-gate 47 a second input 48 of which is connected to the counting output 22, so that, finally, a signal $Q_o + Q_1.CP_1$ is obtained at the output 49 of the OR-gate 47. This output 49 also controls the switch 4 which, consequently, will apply a current $I_A$ to the column conductor 1 when the counting output 22 has the value "1" or when the counting output 23 has a value "1" during the clock period $CP_1$ (OR both). This results in the desired current correction.

A great number of variations are possible for the embodiments shown, these variations can be easily realized by one skilled in the art. It is, for example alternatively possible to realize the BW-output by means of a NAND-gate circuit whose inputs are coupled to the inverted outputs of the counting flipflops. The BW-output now becomes "0" when all inverted outputs of the counting flipflops are "1", so all the counting flipflops are in the flipflop position "0".

Alternatively other current values may be chosen for the N current sources of the current source circuit so that the brightness modulation curve can be adapted to a different desired curve, as for example, may be necessary for $\gamma$-values other than 2, such as $\gamma = 1.8$ or $\gamma = 2.2$.

Counting circuits having separate count-up and count-down inputs and a count enable CE may alternatively be used. In that case the BW-output is connected to the CE input. The function of the AND-gate 11 has then already been realised in the counting circuit itself. It is likewise possible, as was the case in FIG. 2 for the first excitation switch 4, to activate some of these switches by other decoding combinations of counting outputs, in order to obtain other shapes of the brightness curve. Such variations are fully within the scope of the invention.

Alternatively, it is possible to set the counting circuit to exactly the inverse position of all flipflops, followed by counting up to the maximum position, when further counting is then blocked by means of a so-called "carry"-output which becomes "0" when all counting flipflops contain a "1".

Figure 4:
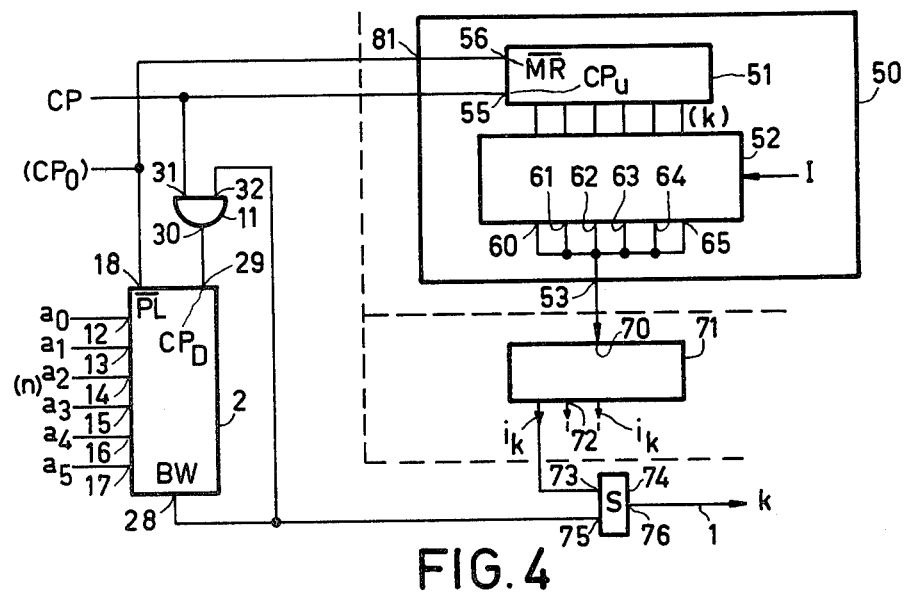
FIG. 4 is a simplified block diagram of a modulator circuit having a central current source with digital control.

FIG. 4 shows an embodiment for one column excitation circuit, in which a central current source 50 is used. Also in this Figure, elements corresponding with elements shown in FIGS. 1 and 2, as well as those of FIG. 6, have been given the same references. The central current source 50 comprises a counting circuit 51 and a current source circuit 52 which is controlled by the counting circuit 51 in a similar manner as the current source circuit 3 in FIG. 1 or 2 is controlled by the counting circuits 2 and the excitation switches, such that a staircase variation of the current supplied by the central current source 50 via an output 53 is obtained, as indicated by means of the solid line 54 in FIG. 5, for example for N=3.

The counting circuit 51 has a counting-up input 55 to which is applied the same clock pulse signal CP as is applied as to the counting circuit 2, and a resetting input 56, which is connected to receive the load command signal $CP_0$ for the counting circuit 2.

At the beginning of a row selection period, the load command signal adjusts the counting circuit 51 to the "0" position whereafter in response to the $2^{N-1}$ clock-pulses following after the load command signal the counting circuit 51 counts up until the maximum counter position "$2^N - 1$" is reached at the end of the row selection period. If so desired, also here the "carry"-output of the counting circuit 51 may be connected to its CE-input as a protection to prevent the counting cycle from continuing when the row selection period has a duration which is longer than a duration corresponding to $2^N$ clock periods.

Also here the current source circuit 52 comprises N current sources having outputs 60 to 65 inclusive, which are all connected to the output 53 of the central current source 50, this output 53 further being connected to an input 70 of a current mirror circuit 71 which has k individual current mirrors having individual k outputs 72, one output for each of the k column conductors. Each of the current mirrors is capable of producing a current whose form is substantially equal to that of the central current source 50, as shown by line 54 in FIG. 5.

Current sources and current mirrors can be realised in a manner which is known per se.

Each output 72 is connected to an input 73 of an excitation switch 74 which corresponds to one of the current mirrors, a switching input 75 of which is connected to the BW-output 28 of the counting circuit 2 and an output 76 of which is connected to the corresponding column conductor 1.

Figure 5:
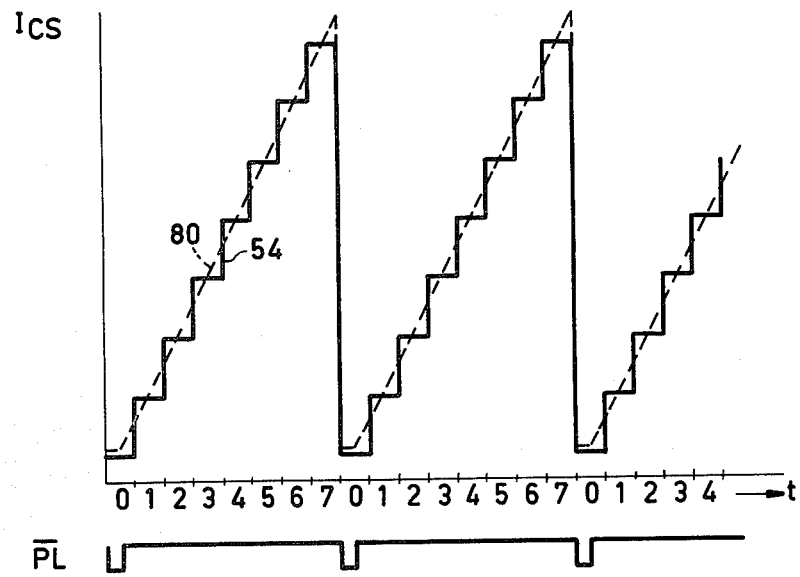
FIG. 5 shows the variation of the current in the central current source.

In the same manner as described for FIG. 1 the BW-output has the value "1" for a shorter or a longer period of time, depending on the initial position of the counting circuit 2, and the value "0" during the remaining portion of the row selection period. During the pulse width thus determined the current at the current mirror output 72 concerned is applied to the column conductor (1) so that, depending on the initial position of the counting circuit 2 a greater portion of the line 54 in FIG. 5 is always passed through. When the line 54 varies as shown in FIG. 5, a square-law brightness modulation in relation to the initial position is again obtained for that picture element of the considered column that is selected during a row selection period.

Also here many variations are possible in decoding the output values of the counting circuit 51, as well as other values for the currents produced by N current sources of the current source circuit 52.

The current mirror circuits 71 optionally may be included at the central current source 50 or may be distributed over the column excitation circuits. In the latter case wiring becomes simpler, which may be advantageous. These two possibilities are indicated in FIG. 4 by means of broken lines.

Alternatively, it is possible to smooth the line 54 of FIG. 5 so that a continuously varying curve, as indicated by means of the dotted line 80 in FIG. 5 is obtained.

In that case the central current source 50 may be replaced by a monotonously varying current source of a type which is known per se, which current source can always be started at a low value (or at zero) by the load command signal applied to an input 81 of the central current source 50 whereafter it monotonously increases until a maximum amplitude is reached at the end of the row selection period.

In the example shown in FIG. 5 the sawtooth varies linearly in order to obtain a square-law brightness modulation, but, as in the preceding examples, the current of this central current source may vary in any desired manner during the row selection period without altering the essence of the invention.

This and similar variants are within the grasp of a person having normal skill in the art.

The addition of a background current $I_0$ is not shown in FIG. 4 but this addition can be effected inter alia in a manner as described in the above-mentioned Netherlands Patent Application, notably as shown schematically in FIGS. 1 and 2.

Figure 6:
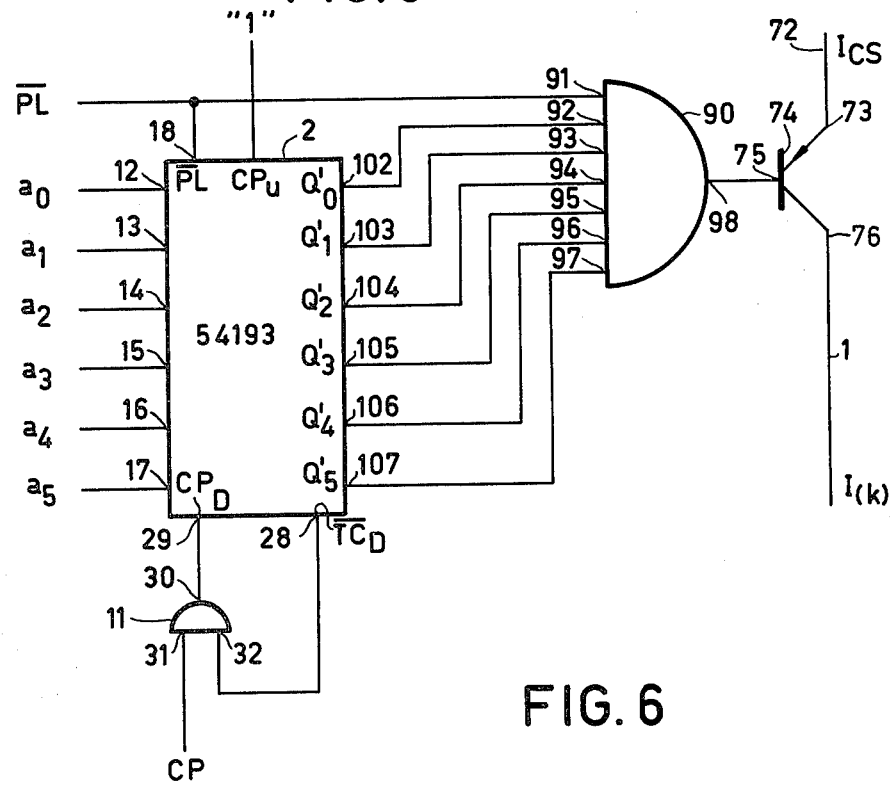
FIG. 6 shows a suitable circuit for adding the background current $i_o$.

An inexpensive possibility not requiring an additional current source and an additional reference current is obtained by using one or more of the current sources already present for this purpose. FIG. 6 shows a possible embodiment, which is suitable for use in combination with the circuit shown in FIG. 4.

To that end, each column excitation circuit comprises an AND-gate 90 having $N=1$ inputs 91 to 97, inclusive, and an output 98 which is connected to the switching input 75 of the excitation switch 74.

In addition, the flipflop inverted output-leads 102 to 107, inclusive for outputs $Q'_0$ to $Q'_5$, respectively of the counting circuit 2 are available and connected to the N inputs 92 to 97 respectively, of the AND-gate 90. The first input 91 of this gate is connected to the load command signal input 18 of the counting circuit 2.

Figure 7:
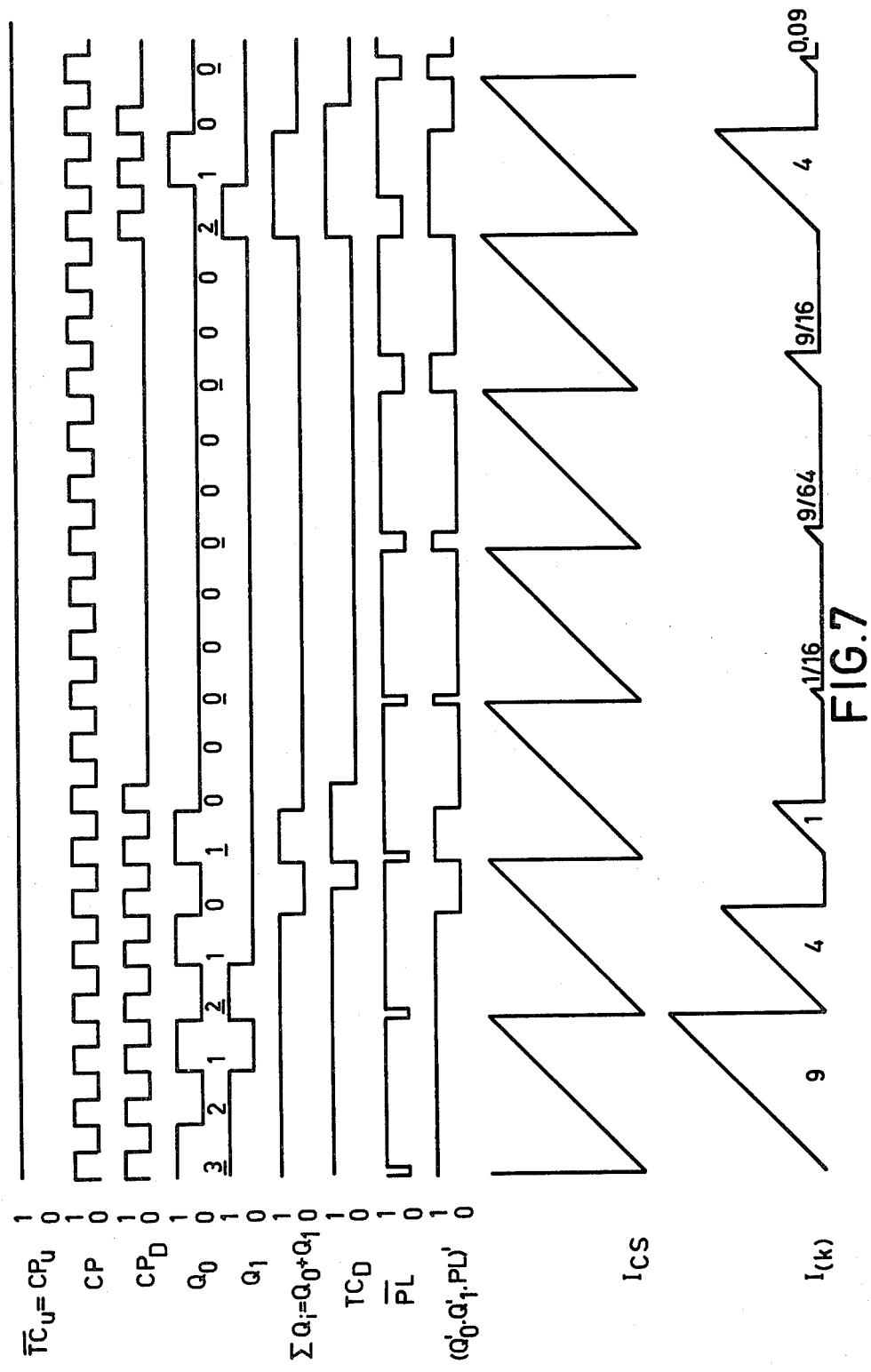
FIG. 7 is a time diagram for the circuit shown in FIG. 6.

The operation of the circuit will now be explained with reference to the time diagram shown in FIG. 7 which is for a counting circuit having (for clarity) only two bits $Q_0$ and $Q_1$ while for the central current source 50 the construction is chosen in which the current $I_{CS}$ produced by this current source varies in a linear sawtooth manner.

By way of example it is assumed that during 8 consecutive row selections the corresponding consecutive picture elements of a column, are to display brightness values $3^2$, $2^2$, $1^2$, 0, 0, 0, $2^2$ and 0, for which the counting circuit 2 is set by the load pulses $\overline{PL}$ to the positions "3", "2", "1", "0", "0", "0", "2" and "0" respectively.

For the period of time during which the counting circuit 2 is not in the zero position, at least one $Q_i=$"1" and so at least one $Q'_i=$"0" and the output 98 of the AND-gate 90 is consequently "0", the excitation switch 74 is closed and the central current source can apply the current $I_{CS}$ to the column conductor 1. The current $I_{(k)}$ through the selected picture element is equal to $I_{CS}$ within that period of time.

When the counting circuit 2 reaches the "0"-position before the end of the row selection period, all $Q_i=$"0" and so all $Q'_i=$"1", while $\overline{PL}=$"1", the output 98 is now therefore "1" and the excitation switch 74 opens, which results thereafter in $I_{(k)}=0$.

If prior to a subsequent row selection period the counting circuit 2 is set to the "0" position, or remains in this position, all $Q'_1$ have indeed the value "1" but as it also holds that $\overline{PL}=$"0" during the pulse duration of the load pulse $\overline{PL}$, the output 98 becomes briefly "0" during this pulse duration, so that always during at least a short period of time $I_{(k)}=I_{CS}$, even if the counter position is "0" during the entire row selection period.

The width of the load pulse can be chosen at will within width limits, so that the average value of $I_{(k),0}$ can be set to the desired background level. FIG. 7 illustrates this by showing some mutually different pulse widths of the load pulse $\overline{PL}$. In general the average $I_{(k),0}$ will be chosen at a value lower than the average value of $I_{(k),1}$, i.e. when the counting circuit 2 is loaded with the position "1".

As the deionisation time for gas discharge display devices is generally longer than a normal television row selection time of 63.5 or 64 microseconds, the $I_{(k),0}$ is sufficient for such picture screens to keep the self-scan principle going.

From the illustrated embodiments of such displays a further advantage will be apparent.

Because of the short row selection periods necessary for television, the deionisation period, especially for picture elements carrying a high current, is so long that for the self-scan principle more than the theoretically necessary 3 selection phases must be used, often even 5 or 6 selection phases.

For a sufficient number of mutually different picture half tones it is generally deemed necessary that $N=7$ or $N=8$, so that $2^7=128$ or $2^8=256$ brightness levels can be used.

Statistically, the maximum value is then very rarely found so that the picture elements end substantially always with a current $I_{(k)}=0$ before the end of the row selection period. It now appears for example that 4 or 5 phases are sufficient, so one selection phase less compared with systems which carry a background current $I_0$ during the entire row selection period. Three phases remain of course the theoretical minimum.

The logic function for the current source switching signal can be performed in many manners which are known per se. When the counting circuit is implemented similarly to the Signetics 54193 in LSI, connections can of course be made to the $Q'_i$ outputs of the flipflops. When, however, the 54193 is used as a discrete IC, only the $Q_i$ outputs are available. The desired decoding:

$$U=(Q_0.Q'_1, \ldots Q'_i \ldots Q'_{-1}.\overline{PL})',$$

is, however, identical to for example $$U(Q_o+Q_1+\ldots +Q_i+\ldots +Q_{n-1}+PL)$$

so that $\overline{PL}$ need not be inverted and, furthermore, the NAND gate must be replaced by an OR-gate having $N+1$ inputs, the output of this OR-gate again driving the switching input 75.

Circuits of this type can also be combined with the circuits shown in FIG. 1 or 2, for example by extending the OR-gate 47 of FIG. 2 with a first input to which PL is applied, it then also being possible to obtain this signal by means of an inverter circuit from $\overline{PL}$ as $(\overline{PL})'=PL$.

Analogous therewith similar OR-gates can be included in one or more of the connections from the counting circuit 2 to the current source switches 4–9, one input being connected to the corresponding counting output and a second to PL.

For picture screens comprising, for example, light emitting diodes, the adjustable $I_0$ for the desired background level remains of course useful. The abovementioned additional advantages with respect to the self-scan principle with gas discharge display tubes are not applicable to LED screens.

What is claimed is:

1. A modulator circuit for a matrix display device having k columns and r rows, comprising a row selection means for sequentially electrically exciting r rows, and k column excitation means for exciting the k column conductors respectively, each column excitation means comprising a counting circuit having N counting elements and a current source circuit, means for adjusting said counting means, shortly prior to the selection of a next row to initial positions corresponding to the (display) picture information applied to said modulator circuit for the corresponding elements of this row, means for applying a number of counting pulses to all of said counting means during a row selection period, this number not exceeding $2^N$, each of said counting means counting by means of the counting pulses produced by said means for applying a number of counting pulses, from the preset initial position until a fixed final position has been reached to determine the pulse width of the excitation pulse applied to a picture element corresponding with that counting means and the current source circuit determining the maximum amplitude of this excitation pulse, characterized in that for the duration of the excitation pulse the current source circuit for a column applies a finite current which varies with time, to the picture element selected in the column, this current always corresponding with the number of used, consecutive positions of the counting circuit.

2. A modulator circuit as claimed in claim 1, characterized in that each current source circuit comprises N sources each having a current output, and N excitation switches, each current source output being connected to an input of the corresponding excitation switch and all outputs of these excitation switches being connected together to the column conductor associated with the current source circuit, and the position of the N switches being determined by the position of the counting elements of the counting circuit associated with this same current source circuit.

3. A modulator circuit as claimed in claim 2, characterized in that for the current source circuit of a column excitation means, the position of the excitation switch i (i=0, 1, ..., N−1) for the current source i is determined by the position of counting element i of the counting circuit for that same column excitation circuit.

4. A modulator circuit as claimed in claim 2 or claim 3, characterized in that the i current sources of a current source circuit are arranged for producing i mutually different currents which are substantially in the ratio of $1:3:8: \ldots :2^i: \ldots :2^{N-1}$, wherein i=3, 4, ..., N−2.

5. A modulator circuit as claimed in claim 4, characterized in that the excitation switch (i=0) of a current source circuit, also switches the first current source on when during the second counting pulse applied to the counting circuit, the position of the second counting element (i=1) corresponds to the value "1", for supplying a correction current.

6. A modulator circuit as claimed in anyone of claims 2, 3, or 5, characterized in that in each column excitation means at least one of the current sources is switched on during a load pulse for the counting circuit, the pulse width of the load pulse being chosen such that a desired background level for the picture elements is obtained.

7. A modulator circuit as claimed in claim 1, characterized in that the modulator circuit comprises a central current source for producing a current which varies with time during a row selection period, and that the current source for each column excitation circuit consists of a current mirror for supplying a current to the column conductor corresponding with said current source during the period of time determined by the counting circuit of the column excitation circuit, this current being substantially equal to the current through the central current source.

8. A modulator circuit as claimed in claim 7, characterized in that during the consecutive counting pulses within one row selection period, the central current source generates one out of a plurality of current amplitude values, which is substantially constant during the duration of a counting pulse.

9. A modulator circuit as claimed in claim 6, characterized in that the central current source generates a continuously varying current during a row selection period.

10. A modulator circuit as claimed in claim 7 or claim 8, for realizing a square-law brightness modulation, characterized in that the current of the central current source varies substantially linearly with time during a row selection period.

11. A modulator circuit as claimed in claim 6, characterized in that each column excitation means comprises a gate circuit coupling the output signal of a current mirror to the column conductor when the counting circuit is in a counting position not equal to the fixed final position and also when a load pulse for the counting circuit is present, the pulse width of the load pulse being such that a desired background level for the picture elements is obtained.

12. A modulator circuit as claimed in claim 7, characterized in that each column excitation circuit comprises a gate circuit coupling the output signal of a current mirror to the column conductor when said counting circuit is in a counting position not equal to the fixed final position and also when a load pulse for the counting circuit is present, the pulse width of the load pulse being such that a desired background level for the picture elements is obtained.

13. A modulator circuit as claimed in claim 8, characterized in that each column excitation circuit comprises a gate circuit coupling the output signal of a current mirror to the column conductor when the counting circuit is in a counting position not equal to the fixed final position and also when a load pulse for the counting circuit is present, the pulse width of the load pulse being such that a desired background level for the picture elements is obtained.

14. A modulator circuit as claimed in claim 9, characterized in that each column excitation means comprises a gate circuit coupling the output signal of a current mirror to the column conductor when the counting circuit is in a counting position not equal to the fixed final position and also when a load pulse for the counting circuit is present, the pulse width of the load pulse being such that a desired background level for the picture elements is obtained.

* * * * *